Sept. 1, 1936.    N. E. LINDENBLAD    2,052,888
SHORT WAVE SIGNALING
Filed Jan. 14, 1933    6 Sheets-Sheet 3
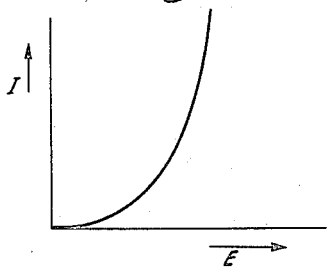
*Fig. 2*
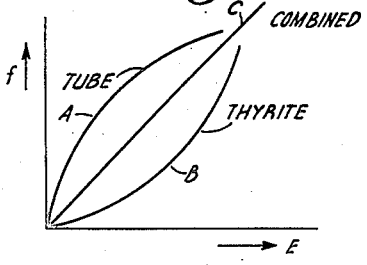
*Fig. 3*
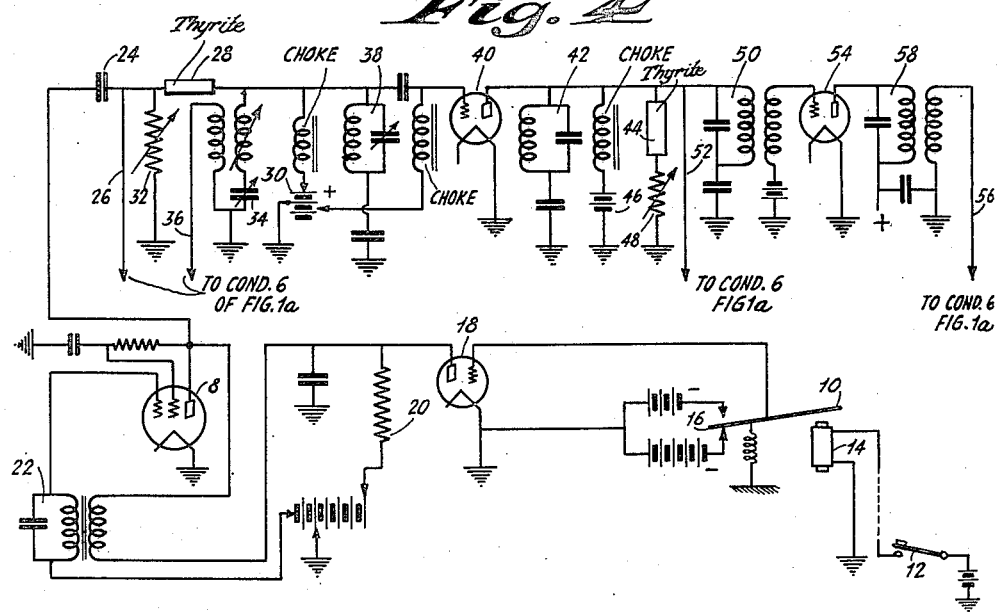
INVENTOR
NILS E. LINDENBLAD
BY
ATTORNEY

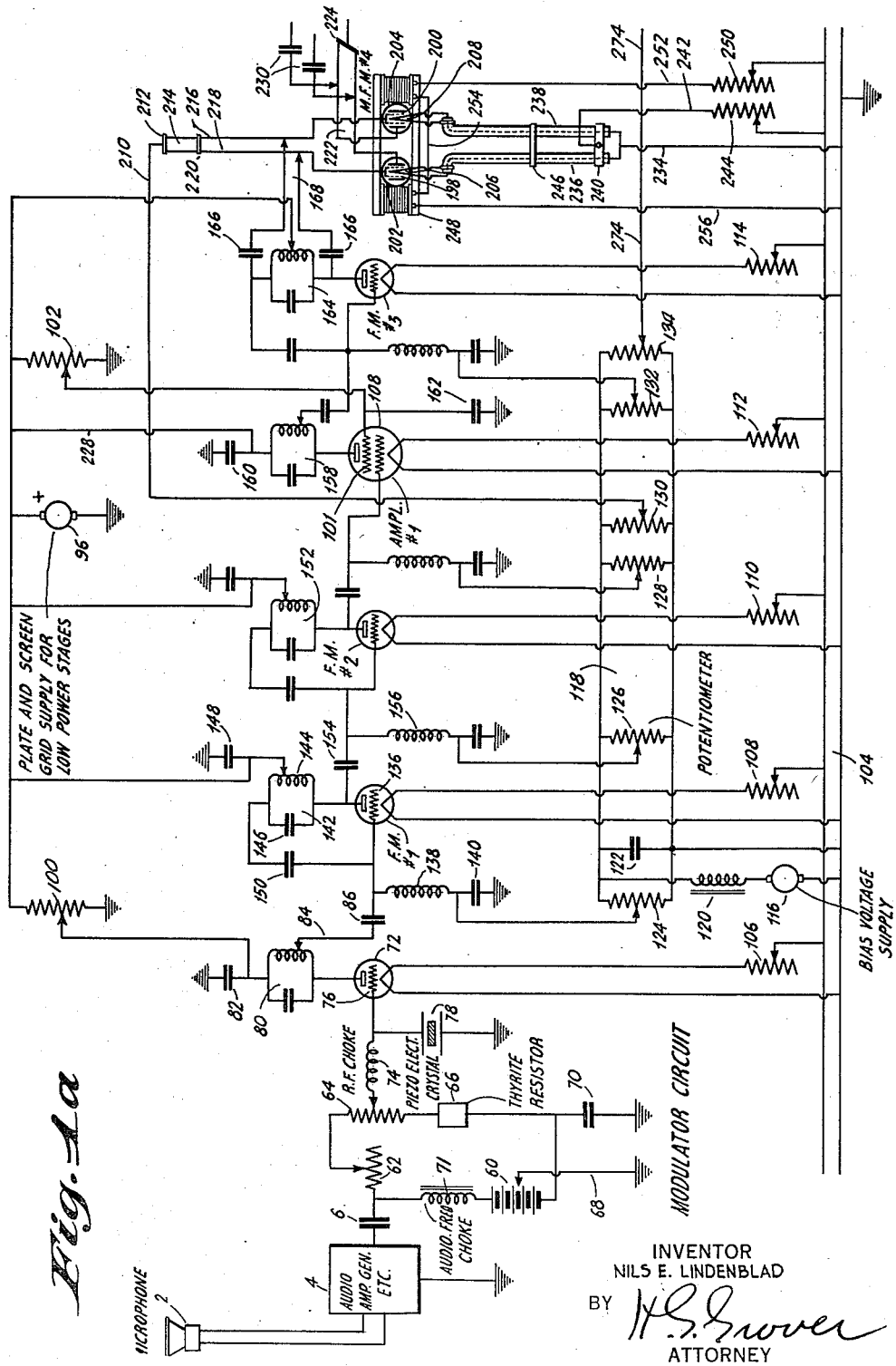

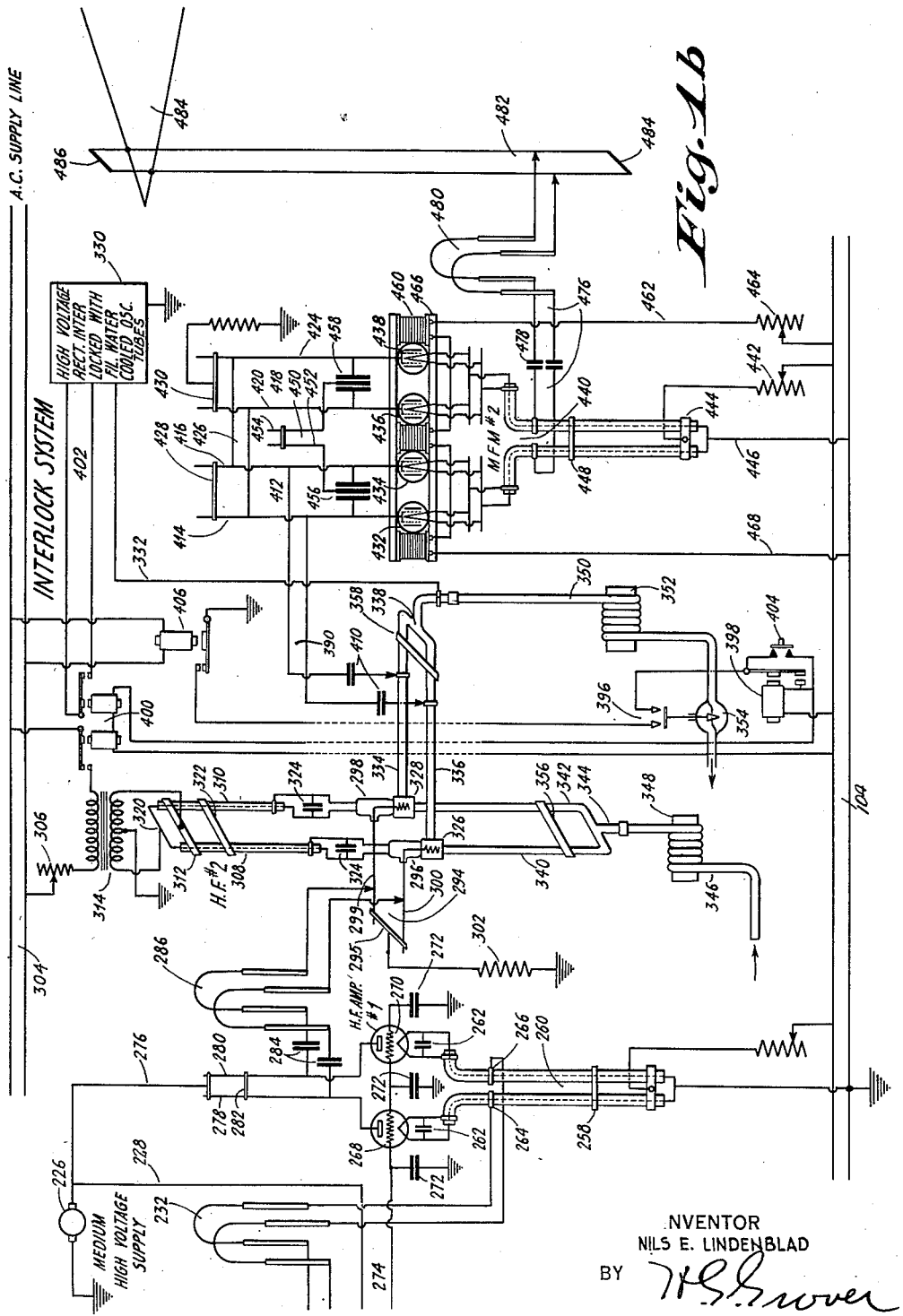

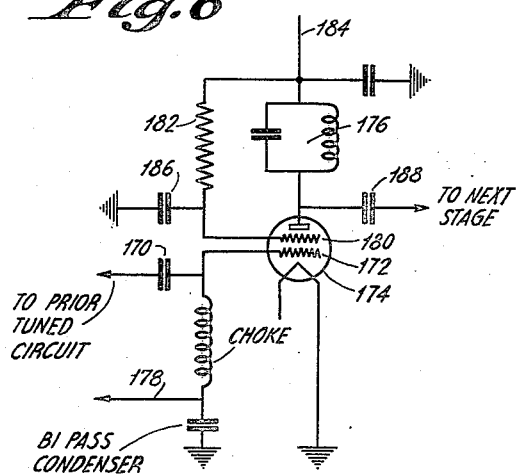
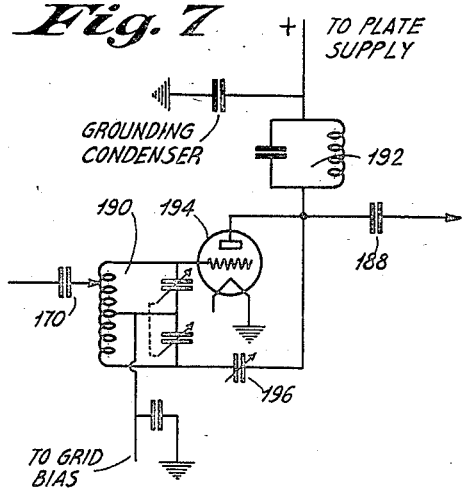
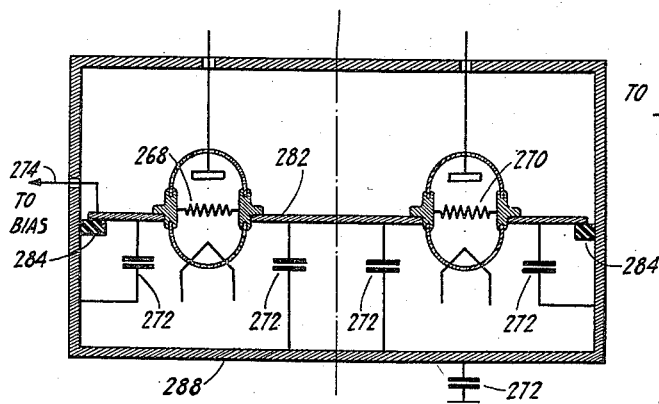
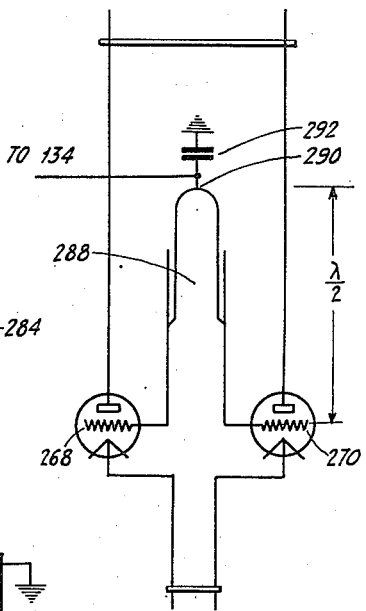
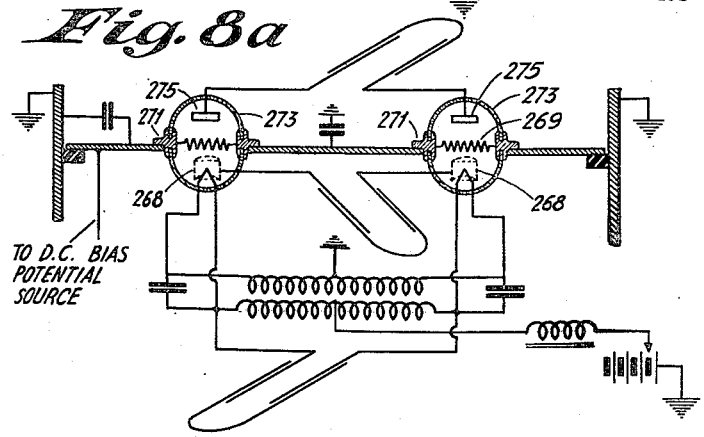

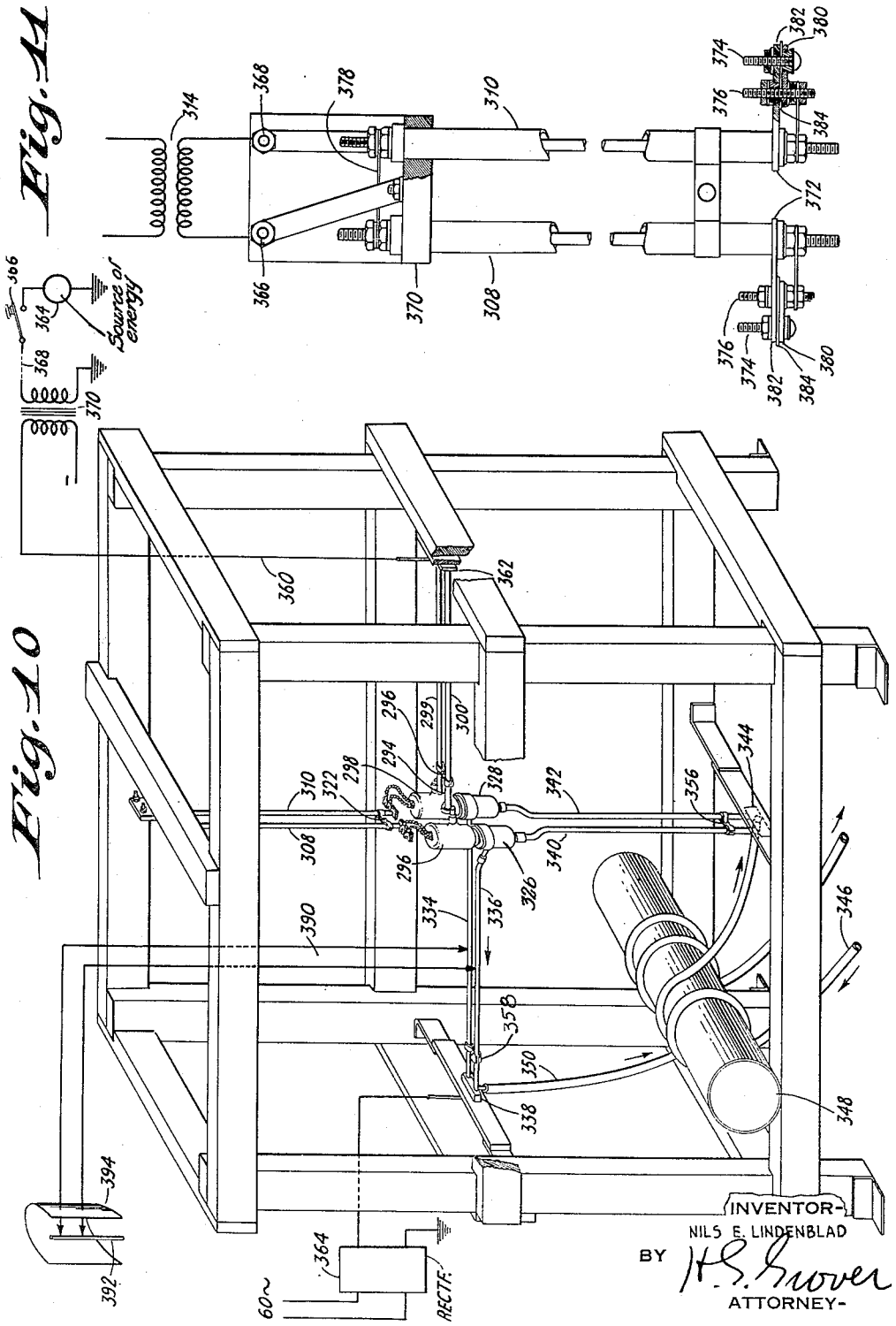

Sept. 1, 1936.  N. E. LINDENBLAD  2,052,888
SHORT WAVE SIGNALING
Filed Jan. 14, 1933  6 Sheets-Sheet 6
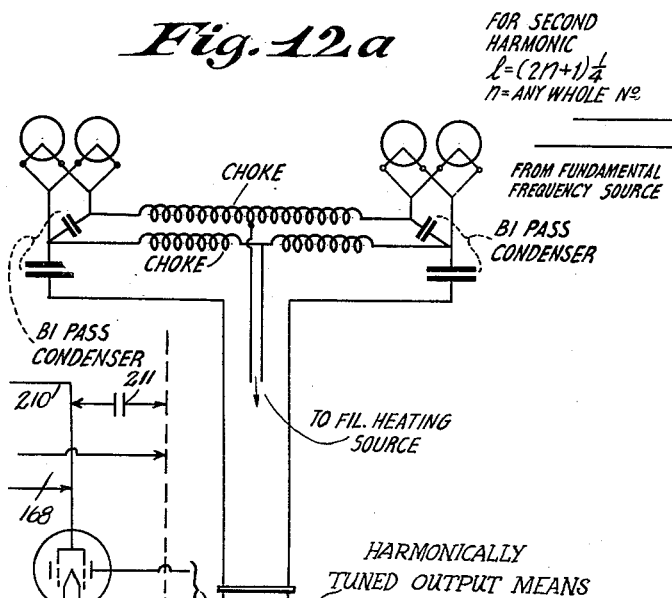
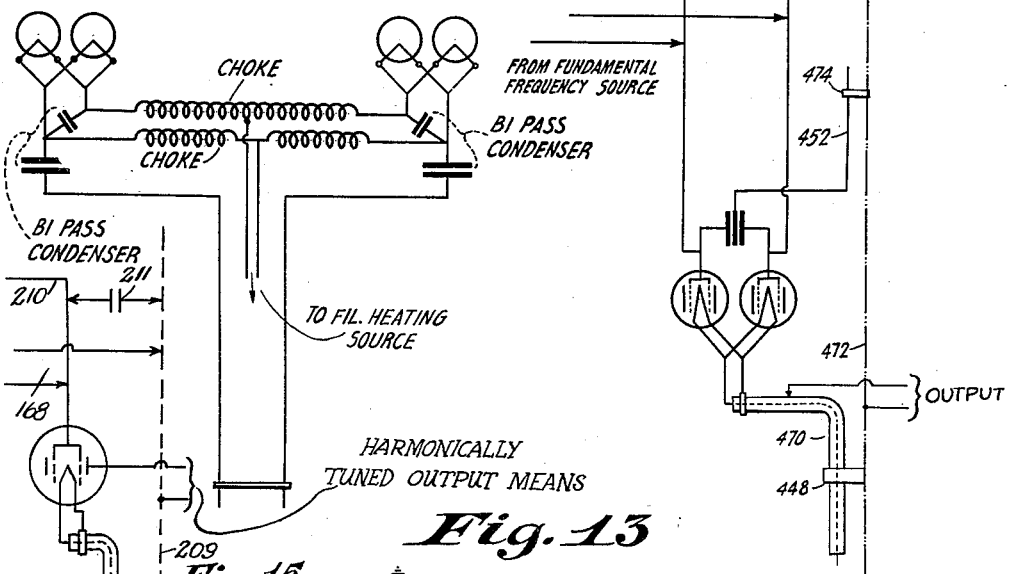
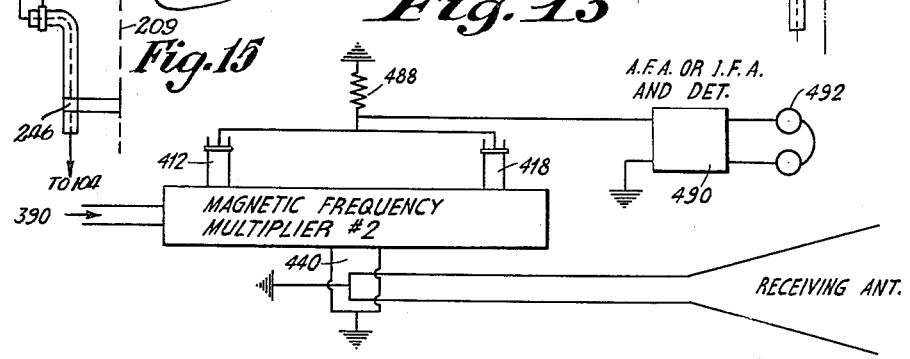
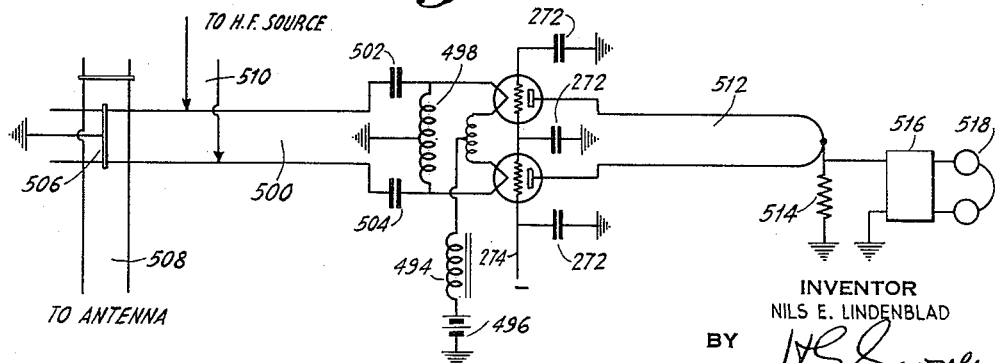
INVENTOR
NILS E. LINDENBLAD
BY
ATTORNEY Patented Sept. 1, 1936

2,052,888

UNITED STATES PATENT OFFICE 2,052,888

SHORT WAVE SIGNALING

Nils E. Lindenblad, Port Jefferson, N. Y., assignor to Radio Corporation of America, a corporation of Delaware Application January 14, 1933, Serial No. 651,809

21 Claims. (Cl. 250—36)

My present invention deals with an ultra short wave length signaling system utilizing at the transmitting end an arrangement for the transmission of frequency modulated waves, although of course it is to be understood that many features of my invention are not to be so limited but may be applied as well to amplitude and phase modulation organizations.

In this system for transmitting frequency modulated waves, which shall be described more fully hereinafter, many units such as the modulating source and frequency wobbler, frequency multipliers, and amplifiers are involved and each unit must be dealt with specially for otherwise, due to the large amount of frequency multiplication at exceedingly short wave lengths, and because of the high frequencies met with, many difficulties rendering the system inoperative would be encountered.

For example, a relatively low frequency oscillator may be frequency wobbled in accordance with voice or low frequency potentials by altering, for example, the grid potential of a regeneratively connected vacuum tube generator. However, such grid or control electrode variation does not produce oscillations which vary linearly with respect to the controlling or voice potentials, but on the other hand, due to the characteristics of the tube or electron discharge device, the output frequency varies non-linearly. The frequency wobbled oscillations then, with frequency multiplication as contemplated herein, have this absolute amount of frequency change increased in direct proportion to the amount of frequency multiplication, as a result of which, at the receiving end of the system, detection of such a frequency modulated and multiplied wave would produce a highly distorted signal. To remedy this objection is, accordingly, one object of my present invention and to do so I provide a system wherein the frequency of a master oscillator may be varied linearly in accordance with control or low frequency voltages. More specifically, I make use of a coupling circuit for applying the modulating voltages to the oscillation generator which coupling circuit distorts the applied voltages in such a way as to compensate for the distortion introduced by the oscillator whose frequency is to be varied.

According to my invention further, the frequency modulated waves are multiplied in successive frequency multiplier stages. Each multiplier stage is so operated, as will be described more fully hereinafter, as to act both as a frequency multiplier and amplifier although there is, of course, some limit to which this action can be combined. Also in order to lessen the number of stages required, a feature of my present invention is the cascading of frequency multiplier stages in a fashion such that the tuned output circuit of one stage serves as the tuned input for the succeeding frequency multiplier stage. In the event that any stages of amplification are found necessary, they are of course provided.

In connection with the frequency multiplication, I prefer to operate the lower frequency multiplier stages in such a way that the control electrodes are so biased negatively that output current flows only upon the application of positive peaks of applied input potentials. There is a limit, however, due to the time lag of electrons within tubes, to which frequencies may be so multiplied. That is to say, assuming that a positive peak appears upon the control electrode of a frequency multiplier tube, due to the exceedingly high frequencies dealt with, there may be a complete reversal of the applied input potential so that a negative peak is reached before the electrons have time to travel to the output electrodes. To remedy this defect is a further object of my present invention and it is accomplished in a fashion very similar to that described in my copending application, Serial Number 603,310, filed April 5, 1932. That is to say, to bring the electrons closer to the output electrodes of the tubes involved in this high frequency multiplying process, I apply a unidirectional magnetic field to the tubes in such a way that the electrons are maintained close to the output electrodes whereby time of travel within the tube is materially reduced. Incidentally, the application of this magnetic field also sharpens cut-off thereby facilitating harmonic production.

Also, in both the frequency multipliers and amplifiers at these exceedingly high frequencies, high interelectrode capacities prevent the building up of necessary potentials at correct phase between the cold electrodes and the electron emitting electrodes or cathodes. To overcome this problem is also a further object of my present invention and briefly it is accomplished by providing circuits for the cathodes which may be tuned so that the cathodes themselves swing in potential at the working frequencies.

In connection with the use of tuned cathode circuits for amplification purposes, another feature of my invention resides in the provision of a unique ultra high frequency amplifier whose control electrodes are maintained at ground potential for the radio frequency currents, the input being applied to a tuned cathode circuit. By so grounding the grids, and by so applying the input energy, much higher frequencies may be successfully amplified, in spite of the fact that this is a less efficient method in conventional circuits. The reason is that accidental degrees of freedom for self oscillations are more readily avoided when using very directly grounded grids than when using other neutralizing methods.

Heretofore, ultra short waves have been produced only in relatively low powered tubes. However, my present invention has as a further object the production of short waves at very high power. Ordinarily this would cause rapid deterioration of the short wave tubes and circuits. To prevent such undesirable action concomitant to high power production of short waves, is a further object of my present invention, and to accomplish it I provide a fluid or water cooled amplifier and/or oscillator system especially adapted for the high powered amplification of very short waves. An important feature of this water cooled system is the provision of high frequency circuits which serve the dual function of acting as high frequency circuits and also as means for conducting cooling fluid to and away from the tubes forming the amplifier and/or water cooled oscillation generator. This water cooled amplifier and/or oscillation generator is further characterized by the fact that the circuits are arranged in such manner that no radio frequency insulators are required, thus increasing the efficiency of the system and obtaining many mechanical advantages. As a further safety factor, I have provided an interlocking system for the water cooled amplifier and/or oscillator which serves to shut down the oscillator electrically should the filament current, plate voltage, or water supply fail.

To further increase the frequency of very short waves at high power is a further object of my present invention and to do so I have provided an improved frequency multiplier adapted to handle, although not limited thereto, large amounts of short wave length power. Features of this frequency multiplier are improved input circuits therefor, a means to prevent the harmonic frequency energy generated from flowing into the relatively fundamental frequency input circuits, and an output circuit connected to the cathode system of the frequency multiplier.

A still further object of my present invention is to provide suitable receiving systems for ultra short waves such as produced by my transmitting system.

Still other objects, as well as advantages and features of my present invention, will become apparent as the detailed description thereof proceeds. This detailed description may best be understood by referring to the accompanying drawings wherein:

Figures 1a and 1b, in combination, illustrate a complete transmitter for transmitting, at a high power, exceedingly short wave length energy modulated either in amplitude, or in frequency alone; or, modulated both in amplitude and in frequency;

Figures 2 and 3 are curves explanatory of the action of my improved modulator circuit used in Figure 1a, whereby linear variation in frequency of an oscillation generator may be obtained in accordance with signal voltages to be transmitted;

Figure 4 illustrates an alternative modulating circuit which may be used to replace the microphone circuit and amplifier shown in Figure 1a;

Figure 5 illustrates an alternative oscillator and coupling circuit for producing linear frequency response in accordance with signals to be transmitted;

Figures 6 and 7 illustrate modified frequency multipliers and amplifiers which may be used in place of frequency multipliers and amplifiers FM #1, FM #2, and, FM #3 of Figure 1a;

Figures 8 and 8a illustrate a possible mechanical construction of high frequency amplifier #1 shown in Figure 1b;

Figure 9 illustrates a modification of that amplifier wherein a tuned circuit is used to maintain the grids short circuited or at ground potential;

Figure 10 illustrates in greater detail the mechanical construction of the water cooled high frequency amplifier #2 of Figure 1b and also shows how that amplifier may be used as an oscillation generator in a short wave transmission system;

Figure 11 shows in detail the mechanical construction of the filament heating circuit used for the water cooled amplifier of Figure 10, or the filament circuit for frequency multiplier #4, high frequency amplifier #1, or magnetic frequency multiplier #2 of Figures 1a and 1b;

Figures 12 and 12a illustrate alternative arrangements for the final frequency multiplier #2 of Figure 1b;

Figures 13 and 14 illustrate receiving systems for receiving, for example, ultra short waves transmitted by the arrangement shown in Figures 1a and 1b; and.

Figure 15 illustrates an alternative arrangement for the magnetic frequency multiplier MMF #4 of Figure 1a.

As already indicated, a system for transmitting exceedingly short wave length frequency modulated and/or amplitude modulated waves is illustrated in Figures 1a and 1b. Voice currents generated by the microphone and its following audio amplifier, which of course may be a keyed tone system such as illustrated in Figure 4, are fed to a crystal controlled oscillation generator through a circuit including a resistor sold under the trade name of "Thyrite". Ordinarily the control potentials or voltages from the controlling source, namely, the microphone or keyed audio oscillator, would cause non-uniform or non-linear variation in the frequency of the oscillations generated by the crystal controlled generator. In other words, the characteristic of the generator is indicated as illustrated in Figure 3 by curve A where the ordinates indicate the frequency and the abscissa the grid voltage. The thus obtained non-uniform frequency variation would then, of course, introduce a corresponding undesired distortion of the signal. To remedy this defect, I couple the audio or voltage control source to the oscillator through a non-linear or non-uniform circuit including the "Thyrite" resistor whose resistance varies non-linearly with the voltage applied across the same. Disregarding the characteristic of the crystal controlled oscillator tube, the "Thyrite" coupling circuit would tend to produce a characteristic such as illustrated at B in Figure 3, and obviously, the combined characteristics result in the linear relation indicated by the straight line C in Figure 3. The non-linear or logarithmic characteristic of the "Thyrite" resistor is illustrated in Figure 2 where the ordinate indicates the current passed by the "Thyrite" and the abscissa, applied control voltage. Of course, it is not necessary to use the "Thyrite" non-linear circuit, for, in Figure 5 I have illustrated a system utilizing a vacuum tube for accomplishing a similar purpose, namely, the production of oscillations by the crystal controlled oscillation generator which vary linearly with frequency in accordance with the controlling audio frequency potentials.

The frequency wobbled or modulated oscillations are then fed successively into frequency multiplier FM #1 and frequency multiplier FM #2. The output of frequency multiplier FM #2 is then fed into amplifier #1 and thence into another frequency multiplier FM #3. To prevent parasitic oscillation generation, the frequency multipliers numbers 1, 2 and 3 are shown to have plate circuit neutralization. However, for this purpose, they may be replaced by the systems shown in Figures 6 and 7, which, respectively, indicate frequency multipliers of the screen grid type and of the split input circuit neutralization type.

It goes without saying that these frequency multipliers may also be of the two tube variety, or, in fact, any of the types disclosed by C. W. Hansell in his United States Patent No. 1,878,308, granted September 20, 1932. Also amplifier #1 need not be of the screen grid type, but may be neutralized in known fashion or may be of the pushpull type utilizing either screen grid tubes or cross-neutralization.

The modulated high frequency energy appearing in the output circuit of frequency multiplier #3 is then fed to the grids or electrodes adjacent the cathodes of my improved magnetic frequency multiplier #4 described in greater detail in my copending application Serial Number 603,310, filed April 5, 1932. In the present instance, however, input energy is applied to the grids MFM #4, output energy being derived from the plates, although of course, the arrangement shown in my copending application may be utilized here equally as well. For best operation, the cathodes of my magnetic frequency multiplier #4 are connected together in phase opposition by a high frequency circuit consisting of conductors having uniformly distributed inductance and capacity. The magnetic field as explained in my copending application, and, as will be explained more fully hereinafter, serves to increase the efficiency and render operable the frequency multiplier at the exceedingly high frequencies now present in the system.

The output of magnetic frequency multiplier #4 is then fed to my improved high frequency amplifier HF #1. This amplifier, it will be observed, is unique in many respects especially with respect to the grounding of the grids for high frequency currents and the utilization of an input circuit connected in phase opposition to the cathodes of the pushpull arrangement.

Output energy from high frequency amplifier #1 is then fed to my improved water cooled high frequency amplifier #2. This amplifier, which may also be used as an oscillation generator, is shown in greater mechanical detail in Figure 10 wherein it is illustrated connected and controlled electrically so as to generate and deliver modulated high frequency oscillations. An interlock system is provided for the water cooled amplifier as shown in Figure 1b whereby shut down will occur should the cooling water supply fail or should plate voltage or filament heating current fail.

The amplified output of the water cooled high frequency amplifier #2 is then fed to my improved magnetic frequency multiplier #2 consisting of a plurality of tubes whose input circuits are connected effectively in parallel. Output energy, frequency multiplied with respect to the output of the water cooled high frequency amplifier #2, is taken from the filament or cathode circuit of the magnetic frequency multiplier #2 and then fed to a suitable antenna as illustrated. To prevent feed back of harmonic frequency energy into the input circuits, I have provided, as will be explained more fully hereinafter, a circuit connected to voltage nodal points on the input circuits of the magnetic frequency multiplier.

The many features involved in the arrangement shown in Figures 1a and 1b are not, of course, limited to transmitting. For example, I have shown in Figure 13 a receiving system utilizing my improved magnetic frequency multiplier circuit #2, and, in Figure 14, I have shown a receiving system utilizing my high frequency amplifier #1 per se, or that amplifier together with the associated equipment leading up to that point.

Voice or other sound energy impinging upon microphone 2 will cause variations therein of resistance, reactance or impedance, which, in known fashion, may be utilized to cause the flow of audio frequency or low frequency currents. These currents or voltages may in turn be amplified by the audio amplifier 4 and fed through the large condenser 6 to the crystal controlled generator for varying its frequency of oscillation.

In place of the microphone and audio amplifier 4 of Figure 1a, an arrangement such as shown for example, in Figure 4 may be used.

Referring in detail to Figure 4, screen grid tube 8 connected regeneratively, as shown, to function as an audio frequency oscillator, is turned on and off by the action of switch 10. The latter switch is in turn operated by means of a key 12 causing the electromagnet 14 to move contact 16 to its upper position. Opening of key 12, of course, allows 16 to fall upon its lower contact. In its lower position, a large negative bias is impressed upon the grid of tube 18 as a result of which little current is drawn through resistor 20 allowing sufficient plate potential to be applied to tube 8 to cause it to oscillate at an audio frequency rate depending upon, in general, the tuning of grid circuit 22. In its upper position, contact 16 causes the grid of tube 18 to assume such a potential as to allow passage of current therethrough as a result of which there is such a fall of potential across resistor 20 as to reduce the plate potential of tube 8 to an inoperative value. Consequently, in its upper position, armature 16 will prevent the generation of audio frequency currents and their subsequent passage through condenser 24. If desired, this primary audio frequency so generated and so keyed on and off, may be fed through conductor 26 to condenser 6 of Figure 1a.

However, if desired, the audio frequency generated by tube 8 may be frequently multiplied before use in the transmitter.

One way of doing this is to feed the audio frequency generated through condenser 24 to a "Thyrite" resistor 28, the biasing current through which is supplied by source of potential 30 and controlled by variable resistor 32. By referring to pages 92 et seq., of the General Electric Review for February 1930, vol. 33, No. 2, it will be found that "Thyrite" is a material which passes current non-linearly with respect to applied voltages. In other words, "Thyrite" has a characteristic such as illustrated in Figure 2 wherein a relatively small increase in potential causes a disproportionate increase of current through it. Consequently, application of audio frequency current to the "Thyrite" resistor 28, will cause the wave form of current passing therethrough to become distorted as a result of which, in the serially tuned resistance circuit 32, preferably tuned to a desired harmonic, harmonic frequency energy may be derived which may be fed by means of conductor 36 to the condenser 6 of Figure 1a.

Further, if desired, the harmonic frequency energy may be resonated in a parallel tuned circuit 38 and amplified by means of electron discharge device 40. By a suitable choice of bias from source 30 for device 40, as disclosed in United States Patent No. 1,878,308, granted to C. W. Hansell, already referred to, a further harmonic may be generated in the parallelly tuned output circuit 42 of tube 40. However, it may be desired to use tube 40 merely as an amplifier in which case the output energy appearing in circuit 42 may be fed into a further "Thyrite" resistor 44 polarized by source 46 and maintained at a suitable operating point by adjustment of resistor 48. A further harmonic will then be generated in parallelly tuned circuit 50, keyed or modulated in accordance with the actuation of keying switch 12. If desired this harmonic may be fed through conductor 52 to condenser 6 of Figure 1a, or, it may be amplified by means of tube 54 and then fed through conductor 56 to condenser 6 of Figure 1a. In the alternative, tube 54 may be so biased in accordance with the Hansell patent already referred to, that a still higher harmonic may be derived from output circuit 58, suitably tuned, for application to condenser 6 of Figure 1a.

Condenser 6 is chosen sufficiently large as to pass with facility either the amplified audio tones derived by means of the microphone, or the keyed alternating currents such as obtained from a tone system such as described in connection with Figure 4. The direct application of these modulating potentials or controlling potentials to the grid of the crystal controlled oscillation or alternating current generator of Figure 1a, would produce a non-linear variation in frequency of convex shape such as curve A of Figure 3. As this would tend to distort, for example, the receiver output, I provided a coupling circuit between the source 4 and the crystal controlled generator which will remedy this defect. In Figure 1a this coupling circuit consists of the serially connected source of potential 60, variable resistors 62, 64 and an impedance 66, here in the form of a "Thyrite" resistor having a non-uniform or non-linear characteristic. This circuit is grounded for unidirectional potentials by way of conductor 68 and one end of the "Thyrite" resistor or impedance 66 is grounded for alternating currents by way of condenser 70. To prevent the by-passing of low frequency or signaling potentials directly to ground through source 60 or line 68, there is also interposed in this coupling circuit an audio frequency choke 71 which forces the audio potentials or low frequency potentials to be impressed across the "Thyrite" resistor 66.

Assuming the crystal controlled generator to have a linear grid voltage-frequency characteristic, the resultant connection of the "Thyrite" resistor into circuit will cause the generator output to vary in frequency in a concave fashion as illustrated by curve B of Figure 3. Consequently, the resultant action of the "Thyrite" resistor and the distorting effect of the crystal controlled generator tube 72 is the production of oscillations in the output circuit of the crystal controlled generator 72 which will vary in frequency linearly or uniformly with respect to the amplitude of the controlling potentials applied through condenser 6.

The radio frequency choke 74 offers no appreciable hindrance to the passage of the controlling currents or potentials which are impressed, as indicated, upon the grid 76 of the tube 72. The frequency controlling piezo-electric crystal 78 is connected between the cathode and control electrode or grid 76 of tube 72; and, the output circuit 80 formed of inductance and capacity is connected between the anode and cathode for high frequency currents through the action of by-passing condenser 82. Resistors 62 and 64 serve the dual function of controlling the unidirectional potential or polarizing potential applied to grid 76 of tube 72 and also control the amount of modulating potential swing on the grid 76 of tube 72. Oscillation generator 72, though crystal controlled, is thereby swung linearly with respect to the amplitude of the applied modulating potentials and this swing in frequency, though relatively small, becomes magnified considerably by the succeeding frequency multipliers which step up the absolute frequency shift, that is to say, the shift measured in cycles per second.

Frequency modulated output energy is taken from the output circuit of tube 72 through conductor 84 and fed through by-passing condenser 86 to the input circuit of frequency multiplier #1.

It is not essential that "Thyrite" resistors be used and that the particular crystal controlled generator illustrated in Figure 1a, be relied upon. The generator itself may be any form of oscillation generator having any form of frequency control such as simple tuned circuits, tuning forks and the like. Also, the frequency varying potentials need not be applied to the grid but may be applied to another electrode of the oscillation generator.

Thus, the arrangement shown in Figure 5 may replace the modulator circuit of Figure 1a and its associated generator included between condensers 6 and 86.

The tube 88 replacing the non-linear impedance or "Thyrite" resistor 66 of Figure 1a, has its control grid variably tapped to the polarizing source 90 through resistor 92 so that the characteristic of the tube is somewhat similar to that shown in Figure 2. Accordingly, the plate voltage on the crystal controlled oscillation generator 94 of Figure 5 will not have the same form or outline as that fed through capacitor 6 but will be so distorted that variations in frequency produced by variable voltages upon the plate or cold electrode 100 of tube 94 will cause variations in oscillation frequency which are linear with respect to the amplitudes of control potentials fed to condenser 6.

The frequency modulated energy passing through condenser 86 is then fed successively to frequency multiplier #1, frequency multiplier #2, amplifier #1, and frequency multiplier #3.

Plate potential for these stages is supplied by source 96, which also, through variable resistor 100 supplies plate potential for oscillator 72. The screen grid 101 of amplifier #1 is supplied with unidirectional potential also from source 96 but reduced by the action of resistor 102. Filament heating current or cathode energizing current is supplied from the two wire bus system 104, which incidentally, also supplies other tubes such as tube 72 with heating current, adjustment being effected through voltage reducing resistors 106, 108, 110, 112 and 114.

The grid biasing supply is derived from a suitable source of potential 116, either a D. C. generator or a battery source feeding potentiometer 118 through radio frequency choke 120. The source 116, as also the source 96, may, if desired, be by-passed by suitable by-pass condensers. The potentiometer 118 is provided with a by-passing condenser 122 and variable resistors 124, 126, 128, 130, 132 and 134.

High frequency input to frequency multiplier #1 is derived from circuit 80 tuned to a relatively fundamental frequency, the voltage becoming effective upon the grid 136 of frequency multiplier #1 which has a radio frequency choke 138 suitably grounded at its lower end through radio frequency current by-passing condenser 140. The output circuit of frequency multiplier #1 comprises the resonant circuit 142 having inductance 144 and capacity 146, the circuit 142 being tuned to a desired harmonic frequency. Plate potential for frequency multiplier #1 is fed through the divided output inductor 144, and this feed is suitably grounded for radio frequency currents by the action of by-passing condenser 148. To prevent parasitic oscillation generation, a condenser 150, connected in neutralizing fashion, is provided. If desired, a choke coil may be inserted in the plate supply lead which connects with the conductor extending between the condenser 148 and the midpoint of inductance 144.

By suitably adjusting the tap on resistor 124 to a high negative value, only peaks of the fundamental frequency energy applied to frequency multiplier #1 will cause jabs or spurts of output current to flow, as a result of which circuit 142 will become shock excited to produce large currents of harmonically related frequency. This action is more fully described in Hansell Patent No. 1,878,308, supra.

Circuit 142, of frequency amplifier #1, is of relatively fundamental frequency for frequency multiplier #2, whose output circuit 152 is tuned to a relatively harmonic frequency. The energy is fed to frequency multiplier #2 through condenser 154 and across choke 156.

Since frequency multipliers #2 and #3 are identical in action and connected in similar manner as frequency multiplier #1, further detailed description thereof with respect to their multiplying action will not be given here.

The output of frequency multiplier #2 is fed to the screen grid amplifier 1, whose plate circuit 158 is grounded for high frequency currents by the action of condenser 160 and is tuned by inductance and capacity to the output frequency of frequency multiplier #2. To prevent parasitic oscillation generation of the amplifier, it is made of the screen grid type as illustrated, the screen grid 101 being grounded for high frequency through the action of by-passing condenser 162. It may be found that at higher frequencies the inductance of the lead for the screen grid 101 of amplifier #1 is so great as to prevent the screen grid from being held at ground potential. In that event condenser 162 should be made of a relatively small size so as to series resonate with the inductance of the screen grid and its lead whereby the screen grid is maintained at ground potential for the undesired parasitic frequency.

The output circuit 164 of frequency multiplier #3 has inductance and capacity tuned, of course, to the harmonic of the relatively fundamental frequency appearing in circuit 158. Output energy from frequency multiplier #3 is taken through blocking condensers 166 and transmission line 168 and fed to the grids of frequency multiplier #4 which will be described more fully later.

Clearly, it is not necessary that frequency multiplier and amplifier stages FM #1—FM #3 inclusive, be limited to the arrangements illustrated. Thus, after each frequency multiplier one or more amplifier stages may be inserted. Also, the frequency multipliers themselves need not be of the plate circuit neutralization type but may be as illustrated in Figure 6, of the screen grid type. Thus, fundamental frequency energy may be fed through a condenser 170 such as condenser 86 of Figure 1a to the grid 172 of a screen grid frequency multiplier tube 174. The output circuit 176 is, of course, tuned to the desired harmonic frequency, frequency multiplying action taking place because of this tuning and because of the negative bias applied to the control grid 172 through lead 178. The screen grid 180 is maintained at a suitable potential lower than that of the plate through the voltage drop across resistor 182 connected to the plate supply lead 184. The screen grid grounding condenser 186 may be a large by-passing condenser, but, in the event that the inductance of the screen grid is great relative to the frequencies employed, this screen grid condenser 186 should be made relatively small so as to series resonate with the inductance of the screen grid lead and also of the screen grid itself so that the screen grid is maintained at ground radio frequency potential. Output energy is fed through a condenser 188 bearing a similar relation to condenser 154 of Figure 1a to the next stage which may be either a frequency multiplier or an amplifier stage. The circuit shown in Figure 6 may obviously, by a suitable choice of bias, be less negative, and by suitable tuning of circuit 176, be used for straight amplification rather than for frequency multiplication.

This is equally true of the arrangement shown in Figure 7 which may be substituted for any one or more of the stages FM #1, FM #2, or FM #3 inclusive, in which event if the input circuit 190 is tuned to a fundamental and the output circuit 192 to a harmonic, the arrangement shown in Figure 7 will act as a frequency multiplier, assuming also, of course, that a suitable grid bias of high value is placed upon the grid of the tube 194. For amplification purposes, the grid bias should be less negative so that the tube 194 acts as a straight amplifier and also in this case, circuit 192 would be tuned to the frequency of the input circuit 190. To prevent parasitic oscillation generation, the input circuit 190 is divided as shown and is provided with a suitable neutralizing condenser 196.

As already indicated, radio frequency energy from the output circuit of frequency multiplier #3 is fed through transmission line 168 to the grids 198, 200 of the two tubes 202, 204. These grids, are in effect, cold electrodes adjacent the cathodes or electron emitting electrodes 206, 208 of electron discharge devices 202, 204. The grids of these tubes are polarized to a suitable value from resistor 130 of potentiometer 118 through conductor 210. Conductor 210 is connected to the short circuiting strap 212 for conductors 216, 218 having substantially uniformly distributed inductance and capacity and forming the input circuit for frequency multiplier #4. Tuning of the input circuit 214 formed of conductors 216 and 218 is accomplished by means of the conductive slider 220 which may be, if desired, replaced by a large condenser whose terminals are connected to the conductors 216, 218. To cause a maximum transfer of energy through transmission line 168 to tuned circuit 214, the tapping points of the line 168 on the conductors 216, 218 should be so chosen as to match the impedance of line 168 whereby energy transfer into the input circuit 214 will be reflectionless.

The output circuit 222 of magnetic frequency multiplier #4 is connected to the plates or anodes of the tubes 202, 204 and this circuit, as illustrated, also consists of conductors having substantially uniformly distributed inductance and capacity. Circuit 222 is tuned by adjustment of slider 224. Plate potential is fed from the medium high voltage supply 226, Figure 1b, to conductor 228 and tuning strap 224 and the conductors of circuit 222 to the plates of the magnetic frequency multiplier tubes. Harmonically related output energy is taken from the plate circuit 222 through the by-passing condensers 230 and adjustable length transmission line 232 (Figure 1b) adjustable, as indicated, by means of the trombone slides contained therein.

The filament heating circuit for the magnetic frequency multiplier #4 may be traced from the grounded conductor of the filament bus system 104 through conductor 234, through the conductors shown in dotted lines within the conductive tubes 236, 238 through the far legs of the filaments. Filament current returns by way of the inner legs of the filaments, tubes 236 and 238 short circuiting strap 240, conductor 242 and voltage controlling resistor 244, to the other side of the bus system 104. If desired, high frequency by-passing condensers may be connected across the terminals of each filament adjacent each tube 202, 204. By means of slider or conductor 246, tuning of the cathode circuit is effected.

As so far described, input potentials applied to the grids 198, 200 will cause harmonically related currents to flow in the output circuit 222. These currents will be enhanced in value by adjustment of the impedance of the filament circuit comprising tubes 236, 238 having substantially uniformly distributed inductance and capacity by means of slider 246. However, at the higher frequencies, it will be noted that there is a substantial falling off in power in the arrangement as so far described. This may be due to the fact that because of the time lag of electrons, that is to say, because of the relatively low velocity of the electrons within the tubes 202, 204, there is a complete reversal of the input potentials before the electrons have had time to strike their targets, namely, the plates of the magnetic frequency multiplier tubes. To reduce this time lag I provide a system, described in greater detail in my copending application Serial Number 603,310, filed April 5, 1932, for holding the electrons in readiness for speedy action at the ultra high frequencies involved. This system includes the electromagnet 248 having a rectangular iron yoke and two solenoids or coils. The coils are energized from bus 104, through resistor 250, conductor 252, conductor 254 and return conductor 256. Obviously, by controlling the current flow through the coils of the electromagnet by varying resistor 250, the strength of the unidirectional magnetic field applied to the electrons within the tubes 202, 204 may be varied. That is to say, the magnetic field of the electromagnet is applied in a direction parallel with the longitudinal axes of the electrons 202, 204, or stated a little differently, it is applied in a direction normal to the flow of electrons from the electron emitting cathodes to or through the cold electrodes as the case may be. The magnetic field serves to store up or hold the electrons in the space about the filament or cathode thereby producing effectively an electron emitting surface of large diameter. Hence, the electrons are effectively closer to the cold electrodes or plates and control grids, as a result of which less time is required for the electrons to travel from the electron space to the anodes. Consequently losses are lessened and the harmonic output appearing in circuit 222 is greatly increased.

It is not necessary that the pushpull arrangement shown in Figure 1a for magnetic frequency multiplier #4, be utilized. One-half of the entire system may be dispensed with in which case a grounded metal shield may be arranged in a direction parallel with the conductor 234. The filament tuning would then be accomplished between the shield and conductor 236 by means of either strap 246 or in the event that the strap would short circuit certain polarizing or heating sources, it could be replaced by a large by-passing condenser. Output energy would be derived from the plate conductor and shield. The input circuit would also be tuned by means of strap 220 in contact with conductor 218 and the shield and in the event that this produced short circuiting in the bias supply for the grid, the strap 220 could be replaced with a D. C. blocking condenser. Such an arrangement is shown in Figure 15 wherein 209 is the shield and 211 the direct current blocking condenser.

The grids of the magnetic frequency multiplier are supplied with a negative potential from resistor 130 of potentiometer 118. This negative potential should be of such a value as to maintain the grids highly negative so that only peaks of positive input potential cause output current to flow. The various straps, such as 212, 220, 246, 240 in this circuit as well as in other places where such straps are used, may be grounded for radio frequency as an additional precaution by means of a large by-passing condenser, or, if desired, through a high impedance choke and by-passing condenser combination connected in series.

To amplify the energy fed over adjustable length transmission line 232, (Fig. 1b) I have provided high frequency amplifier #1. Since the filament system of this amplifier is identical with that of magnetic frequency multiplier #4, it will not be described in detail here. The filament circuit, however, is tuned by means of an adjustable strap or conductor 258 to the mean frequency of energy fed through transmission line 232. This tuned filament circuit 260 forms the input circuit for my improved high frequency amplifier #1, and this circuit, of course, has conductors of uniformly distributed inductance and capacity, the filament leads of each tube being effectively in parallel for high frequency currents. In the event that the filament leads have appreciable length, by-passing condensers 262 may be connected thereacross.

The transmission line 232 is tapped on to the conductors or circuit 260 at points 264, 266 for best energy transfer. Preferably, these points should look into impedance on the circuit 260 such that that impedance matches the surge impedance of transmission line 232.

The grids 268, 270 are maintained at ground potential for high frequency by the action of by-passing condensers 272. Should the grid lead inductances be relatively large at the high frequencies involved, these condensers may be made of such a value as to series resonate with the grid lead inductance so as to maintain the grids at the desired ground potential at the operating frequencies. The grids or control electrodes 268, 270 are maintained at a suitable operating potential by means of conductor 274 connected to resistor 134, Figure 1a, of potentiometer 118.

Medium high voltage is applied to the plates of the tubes of high frequency amplifier #1 through conductor 276 and conductors 278, 280 acting in parallel for the direct current plate polarizing potential. The conductors 278, 280 are tuned, by means of short circuiting conductor strap 282, to the desired operating frequency. Amplified output energy is taken from the output circuit formed by conductors 280 and 278 and short circuiting strap 282 through condensers 284 and adjustable transmission line 286 and fed to the high frequency water cooled amplifier #2.

In operation, standing waves are built up upon the filament input circuit 260 of high frequency amplifier #1 causing the filaments to swing in potential oppositely with respect to the grids 268, 270, as a result of which amplified output energy appears in the plate circuit of the high frequency amplifier tubes.

A preferred mechanical construction for the high frequency amplifier #1 is shown in Figure 8. Both of the high frequency amplifier tubes are contained within a metal container 288. The grids 268, 270 are electrically and mechanically connected to a metal shield 282, supported upon insulating blocks 284 to the metal box 288. This shield is grounded for high frequency through condensers 272 as indicated.

As shown in Figure 8a the grids 268 may be connected to a tuned circuit. For shielding purposes screen grids 269, polarized and grounded in a fashion similar to the grids of Figure 8, are provided. Grids 269 may be of mesh wire, parallel wire, or slotted metallic plate construction extending across the entire cross-section of the tube and being in intimate metallic and electrical connection with the metallic rings 271 to which the glass walls 273 are fused.

A similar additional grid may be provided between the grids 269 and the anodes 275 and similarly connected, but, if desirable, with different polarization similar to the polarization of the fifth electrode of the known pentode tube. In that case, of course, an additional ring would be required and this additional metallic ring would be separated by glass walls from the ring 271.

While preferable, it is not essential that a pushpull arrangement be utilized, for a single tube amplifier may be arranged in a manner similar to the single tube arrangement described in connection with magnetic frequency multiplier #4. In that case a vertical shield would be used to divide the arrangement shown in Figure 8, one tube and its associated circuits being dispensed with. The placing of the shield would be along the dot and dash line shown in Figure 8. Conductor 276 of Figure 1b could then be tuned as a plate circuit by means of a relatively large condenser connecting that conductor to the shield, the condenser being slidable along the conductor and along the shield. Similarly, a condenser would replace the tuning strap 258, and opposite terminals of the last mentioned condenser would be arranged to slide along the left-hand filament conductor and the shield. Input energy could be applied between that conductor and the shield, and output energy could be derived from transmission line 286 one side of which would be connected to the shield rather than to conductor 280 and the other side of which could be connected as shown in Figure 1b.

An important feature of the amplifier is, of course, the maintaining of the grids at radio frequency ground potential. It is not necessary that the condensers 272 be used for that purpose, for, as shown in Figure 9, the grids 268, 270 may be connected together by means of a U-shaped slider 288 having uniformly distributed inductance and capacity effectively one-half wave length long as indicated. Consequently, the grids 268, 270 would be at ground potential as would also be the grid biasing feed point 290 which, if desired, may be grounded by means of a grounding condenser 292.

The high frequency amplifier #1, through transmission line 286, feeds the tunable input circuit or grid circuit 294 of the fluid or water cooled tubes 296, 298. The input circuit 294 as shown, is formed of two conductors having uniformly distributed inductance and capacity tuned by adjustment of slider 295 in contact with the input conductors 299, 300 forming the input circuit. Grid or control electrode bias is obtained due to rectification action by the use of resistor 302 connected to the conductor slider 295. The filaments of the tubes 296, 298 are energized from the A. C. supply line 304, filament temperature control being obtained by means of variable resistor 306.

The filament or cathode circuit of the tubes 296, 298 consists of the conductor tubes 308, 310 connected through short circuiting strap 312 to one terminal of the secondary of filament transformer 314. The low frequency A. C. heating energy, therefore, passes through tubes 308 and 310 to the righthand filament leads and is returned through the inner conductors within the tubes 308, 310 to the other terminal of the secondary of transformer 314 through connection 320. The impedance of the filament circuit is adjusted by means of slider 322, and the filament heating conductors for each tube are arranged to act in parallel for the high frequency currents by means of by-passing condensers 324.

The electrodes of the tubes 296, 298 are enclosed by the fluid cooling or water cooling chambers 326, 328 in turn supplied with high voltage direct current potential from rectifier 330 through conductor 332 and the linear hollow tubes of conductive material 334, 336, longer than, equal to, or as long as an appreciable fraction of the operating wave length. The hollow conductors 334, 336 are electrically and flow connected together by means of a header or T-shaped element 338 to which the voltage supply lead 332 is connected. The high voltage supply, then, is fed to a point of minimum radio frequency potential, or to the electrical center of the U-shaped water cooled anode conductor structure comprising the linear tubes 334, 336. The linear tube structure, forming part of the high frequency circuits are of appreciable length relative to the operating wave length so that there is an appreciable fall in potential across portions thereof at the operating frequency.

In similar fashion tubes 340 and 342 also linear or substantially straight, hollow, and made of conductive material such as copper, are electrically and flow connected to the fluid cooling chambers 326, 328. The tubes 340, 342 are also connected together to form a U-shaped conductive loop by the header or T-shaped element 344, in turn supplied with cooling fluid or water through the coiled rubber pipe 346, wrapped about a suitable form 348 of insulating material. The cooling fluid therefore flows through the insulating coil 346 preferably of rubber, through the T-shaped header 344, through the pipes or tubes 340, 342, through the fluid cooling chambers 326, 328 electrically as well as flow associated with the anodes of the tubes 296, 298. From the fluid cooling chambers, the fluid cooling water flows through the tubes 334, 336 through header 338 and through rubber hose 350 coiled about form 352, out through valve 354. This cooling water coming from valve 354 may then be suitably cooled by means of a condenser (not shown) and repumped, if desired, through tube 346 by a suitable pump, not shown. If desired, the flow of water may be reversed. The impedance or tuning of each of the U-shaped cooling circuits for the anodes of the water cooled amplifier tubes 296, 298, is separately adjusted by means of the conductive sliders 356, 358.

By suitable adjustment of the sliders and potentials applied to the water cooled amplifier, it can be made to act either as an oscillation generator in which case it may be locked into step with the oscillations supplied from high frequency amplifier #1, or it can be made to act as a suitable amplifier supplying oscillations in its output circuit formed of conductors 334, 336, only when input potentials are applied to the input circuit 294.

While the arrangement of tubes forming the water cooled amplifier #2 has been shown in Figure 10 as an oscillation generator, the mechanical construction thereof may be more clearly observed by referring to that figure as well as Figure 11. Thus, turning to Figure 10, the tubes 296, 298 are connected to the water cooling chambers 326, 328. Cooling water is supplied through the rubber hose water inlet pipe 346 wrapped about form 348. This cooling water is then fed to the T-shaped header 344 from whence the water divides and flows up tubes 340, 342 into the bottom of the cooling chambers 326, 328. The cooling water and fluid then flows through the pipes or tubes 334, 336 where it is joined in the T-shaped header 338 and removed by way of rubber hose 350 wrapped about the common form 348.

The grid circuit 294, as shown in Figure 10, consists of the two tubes or conductors 299, 300. The slider 295, of course, may be moved along the length of the conductors 299, 300 for tuning purposes, and grid biasing potential is supplied through conductor 360 connected to the brass terminal 362 in turn connected to the grid conductors. As shown in Figure 10, in addition to the negative potential, there is superimposed upon the grid of keyed tone derived from source 364 and key 366 which tone is supplied over land line 368 and transformer 370 to the grids of the tubes. Plate potential is supplied from rectifier 364 and applied to the T-shaped header 338 through conductors 334, 336 to the plates of the tubes 296, 298.

The filament heating and tuning circuit may best be traced by referring to Figure 11. As shown in Figure 11 diagrammatically, the secondary of transformer 314 is connected to the filament supply terminals 366, 368. Heating current may then flow from terminal 366 and the brass conducting piece 370 down the filament tubular conductors 308, 310 into the filaments by way of the metal straps 372 and filament terminals 374. The return current from the filaments passes through the terminals 376, the conductors within the tubes 308, 310 through conductive connection 378 to the other filament supply terminal 368.

The condensers 324 shown in Figure 1b may be formed by the capacity existing between the copper straps or metallic connectors 380 and 382 which, of course, are separated by some suitable insulation such as the mica bushings 384.

The filament tuning strap 322, as shown in Figure 10, for longer waves are placed as closely to the tubes as possible forming a fairly direct short circuit between the filaments or cathodes. When shorter waves are to be produced, this slider is located further away but not necessarily a half wave length away from the filaments, although successful operation will be obtained even at that adjustment.

Either of the tubular plate circuits arranged at right angles to one another may be used as an output circuit. One pair may, if desired, be adjusted as a high impedance support and all of the tuning accomplished by adjustment of the slider on the other pair of tubular conductors, or, both circuits may be tuned and worked in parallel. Also, if desired, it is not necessary that the water tube circuits be arranged at right angles, but, a single pair of tubes or pipes may be used, each tube of the set being longitudinally divided into two compartments so that the same tube provides for inlet and outlet water flow. Also, if desired, although not preferable, the plate water cooling circuits may be arranged at an angle other than at right angles either obtuse or acute, and if desired may be arranged to run parallel to each other.

As shown in Figure 10, the output energy is fed through transmission line 390 to a half wave radiator 392 provided with a parabolic reflector 394 for unidirectional propagation.

The T-shaped headers on the anode tubes and the brass terminal piece 362 on the grid tubes, as well as the connections such as 312, see Figure 1b, for the filament tubes are voltage nodal points for the high frequency currents and this construction offers decided mechanical and electrical advantages. That is, these points, need only be insulated for the D. C. potentials, and may be held at ground for the radio frequency potentials besides serving as points for mechanically supporting the entire arrangement. Thus, as shown in Figure 10, the tubes are firmly supported at points 362, at the water headers 344, 338 and by the filament supply circuit by attachment to the wooden framework or, if desired, suitably insulated metallic supports.

The various sliders may be used for adjusting the various circuits to various impedances or desired tunings. Output energy is taken from a point away from the plate sliding tuner on the horizontal conductors 334, 336 shown in Figure 10 at points such that the impedance of the hollow conductors between the tapping points and the slider equals the surge impedance of the transmission line 390, or as shown in Figure 1b, equal to the surge impedance of the transmission line 390 feeding the final frequency multiplier and amplifier.

To repeat, because of the unique construction of the water cooled amplifier, no radio frequency insulators are required, and this, as already indicated, is an important advantage inasmuch as one of the most troublesome features in the high frequency field is the problem of providing suitable radio frequency insulation.

There has also been provided, as shown in Figure 1b, an interlock system to prevent the destruction of the tubes in the water cooled amplifier stage due to failure of either cooling fluid or electrical energy. In the event of water failure, the valve armature of valve 354 will drop, opening contacts 396. The opening of contacts 396 will consequently break the circuit from the bus 104 through electromagnet 398. Simultaneously, electromagnets 400 will become deenergized as a result of which the primary of transformer 314 will be opened causing the deenergization of the filaments of the water cooled amplifier. At the same time deenergization of the electromagnets 400 will open circuit 402 causing deenergization of the high voltage rectifier 330 thereby removing plate potential from the water cooled amplifier. Upon a return of cooling water supply the system must be manually reinstated by means of push button 404.

Assuming the alternating current source 304 for the high voltage rectifier 330 and for the filaments of the water cooled amplifier to fail, then, electromagnet 406 will become deenergized and successively electromagnets 398 and 400 will become deenergized causing the action as described above. Here again, return of the source of alternating current at 304 will not cause the system to start up, but manual reinstatement must be made by means of push button 404. It should be obvious, of course, why this interlock is provided, for failure of water supply would cause the rapid deterioration of the expensive water cooled tubes 296, 298; and, if the filaments were energized with the high plate potential, they would be subjected to high undesirable stresses in their relatively cold condition.

The input to the high frequency water cooled amplifier from transmission line 286, is fed to the conductors of the input circuit 294 at points so spaced away from the short circuiting strap 295 that the portions of the conductors included between the tapping points and the short circuiting strap have an impedance substantially equal in value to the surge impedance of transmission line 286 to prevent dissipation of power.

The transmission line 390 need not be tapped on to the conductors 336, 334 through blocking condensers 410, but may be spaced from short circuiting or tuning strap 358 so as to suitably load the power amplifier. However, the transmission line 390 is tapped on to the input circuit 412 consisting of two conductors 414, 416 having substantially uniformly distributed inductance and capacity at points such that the transmission line 390 faces into an impedance or resistance equal in value to its own characteristic impedance or resistance. In this manner most efficient transfer of energy over transmission line 390 is obtained. The other portion of the input circuit for magnetic frequency multiplier #2 consists of a circuit 418 having conductors 420, 424 of substantially uniformly distributed inductance and capacity. The two circuits 412, 418 are tied together by means of a transmission line 426 an odd number of quarter wave lengths long at the input frequency, namely, the output from the water cooled amplifier #2. Transmission line 426 should be tapped on to circuit 412 so as to suitably load it and should be tapped on to circuit 418 so as to face an impedance equal in value to the surge impedance of the line 426 or in other words it should be tapped on to matched points on circuit 418. The two circuits 412, 418 are tuned respectively by short circuiting conductors 428, 430 which may be replaced by, if desired, condensers.

As shown in Figure 1b, the magnetic frequency multiplier #2 makes use of four tubes which can effectively dissipate the power from the water cooled amplifier without requiring water cooling themselves. Of this group of tubes, tubes 432, 434 have their cathodes connected in parallel. Similarly, tubes 436, 438 have their cathodes or filaments connected in parallel. By-passing condensers may be connected across the filament leads as shown in connection with the high frequency amplifier #1 by means of the condensers 262. For the sake of clarity these condensers have been omitted here.

The input circuit 412 connects the cold electrodes adjacent the electron emitting cathode of tubes 432, 434 in phase opposition for the fundamental frequency input energy. Similarly, the circuit 418 connects the grids of the electron discharge devices 436, 438 in phase opposition. Transmission line 426 connects the two input circuits 412, 418 in parallel. The anodes of all of the tubes 432, 434, 436 and 438 are left floating, that is to say, disconnected from circuit. The parallelly connected cathodes or filaments of the pairs of tubes 432, 434 and 436, 438 are connected together in phase opposition by means of a harmonically tuned cathode circuit 440 which serves to energize the parallelly connected filaments or cathodes in parallel. That is to say, cathode heating energy flows through current controlling resistor 442 to conductor strap 444 and thence through the parallelly connected filaments. Return current flows from the filaments through the inner conductors and to ground by way of the common return 446. The cathode circuit 440 which connects the pairs of cathodes in phase opposition for radio frequency currents is tuned, by means of slider 448 which may be replaced by a condenser, to a desired harmonic frequency.

To prevent the flow of harmonic frequency energy generated by the magnetic frequency multiplier #2 back into the fundamental frequency circuits, circuit 450 having two conductors 452, 454 has been provided. This circuit is tuned so as to be a short circuit for the harmonic frequency, and is connected capacitively to voltage nodal points on the fundamental frequency input circuits 412, 418. To obtain such voltage nodal points, the terminals of conductors 452, 454 are made to be the inner or mid-plates of condensers 456, 458 in turn connected across the fundamental frequency input circuits 412, 418. As opposite points on conductors 412, 418 are of opposite instantaneous polarity it will be apparent that the reactive midpoint at which the mid-plates of condensers 456, 458 are situated, will be at zero fundamental frequency potentials. Hence, there will be substantially no flow of fundamental frequency energy into circuit 450. Also, should there be any tendency for harmonic frequency energy to enter the fundamental frequency circuits, circuit 450 will act as a short circuit for the harmonic frequency such as the second harmonic for example, and the harmonic will tend to remain in the low impedance circuit 450 rather than travel back further into the fundamental frequency circuits.

With the arrangement as so far described, I have been able to obtain, using four tubes for the final frequency multiplier, a power of 15 watts at one meter wave length. To increase the efficiency and magnify the output of the frequency multiplier, it is preferable, though not essential, that the electromagnet 460 be provided. This electromagnet as shown, is energized from the D. C. bus 104 through conductor 462 and current controlling resistor 464, current returning after serially passing through the three solenoids having a common iron yoke 466 by way of conductor 468. The magnetic field is here also applied in a direction parallel to the axes of the tube elements, or in a direction normal to the normal travel of electrons within the tube. The effect of the magnetic field is similar to its effect described in my copending application, Serial Number 603,310, filed April 5, 1932. That is to say, the magnetic field from one aspect serves to hold the electrons in space close to the grid or control cold electrodes. Consequently, less time is required during a critical instant when output current is allowed to flow, due to a positive input peak voltage, for electrons to travel from the electron space to the cold electrode relative to the time required when the electrons would have to travel from a point close to the filament or cathode to the cold electrode. Also, the magnetic field serves to sharpen cut-off or cessation of output circuit energization with a reduction of input potentials, as a result of which harmonic generation is enhanced.

Figure 12a illustrates an alternative arrangement of feeding the filaments of the four tubes of the final frequency multiplying arrangement through a choke coil arrangement.

It is not essential that four tubes be used. The wiring diagram for two tubes is shown in Figure 12 and obviously is identical with the arrangement shown in Figure 1b with the exception that filament tuning is accomplished by means of slider 448 contacting with the filament tube or conductor 470 and with the metallic shield 472. Similarly, the circuit for stopping harmonics from entering the fundamental frequency circuit is tuned by movement of slider 474 contacting with conductor 452 and the grounded shield 472.

Returning to Figure 1b, output energy is taken from the cathode tuned circuit 440 by way of adjustable transmission line 476 through by-passing condensers 478 the line being adjustable by means of trombone slides 480. The transmission line is coupled to the filament output circuit so as to suitably load the same, and the far end is connected to the short circuited transmission line 482, short circuited by conductor 484. The transmission line 480 is tied on to circuit 482 so as to face its own characteristic impedance in transmission line 482 which transmission line in turn feeds an expanding V-antenna 484 suitably spaced from the short circuited end 486 of transmission line 482. The V-antenna 484 may be of the type described in my United States Patent No. 1,927,522, granted September 19, 1933; or may be of the type described by Philip S. Carter in United States Patent No. 1,974,387, granted September 18, 1934; or it may be of the type described in my United States Patent No. 1,884,006, granted October 25, 1932.

The final wave radiated over the antenna will, of course, be modulated in frequency in accordance with the applied signal or control voltages. It may also be modulated in amplitude due to the fact that varying voltages on the crystal controlled oscillation generator not only vary the frequency thereof but also the amplitude of oscillations generated. If desired, the amplitude modulation may be eliminated by sufficiently energizing the succeeding frequency multipliers and amplifiers as to operate beyond saturation. In that event, the final wave radiated from the antenna 484 will be modulated only in frequency, all vestiges of amplitude modulation having been removed by the limiting action due to saturation operation of one or more of the preceding multiplier and/or amplifier stages.

The filament heating circuit for magnetic frequency multiplier #2 and, of course, for magnetic frequency multiplier #1, and for the water cooled high frequency amplifier #2, is constructed as shown in Figure 11. However, this construction need not be followed out, but, the filaments may be energized through choke coils, and the tubes forming the high frequency amplifier circuits may be connected to the filaments by by-passing condensers to prevent short circuiting of the heating current fed through the choke coils.

Because of its asymmetric characteristic, the magnetic frequency multiplier is not limited to be used as a frequency multiplier but also may be used for the reception of ultra short wave length signals. Thus, as shown in Figure 13, the magnetic frequency multiplier circuits are indicated diagrammatically by a rectangle. A receiving antenna is shown coupled inductively to the cathode tuned circuit 440. The two circuits 412, 418 are shown connected together and grounded through a resistor 488. Because of the asymmetric characteristic of the system and by suitably tuning the circuits 412, 418 and the input circuit 440, there will be a low frequency or signal frequency component appearing across resistor 488 which may be amplified in the audio frequency amplifier 490 and translated into sound or otherwise used by a suitable translating device or ear phones 492. Also in the alternative, rather than feed a frequency modulated wave into the input transmission line 390, there may be fed into the input transmission line 390 a constant frequency wave as a result of which across resistor 488 any beat frequency may be derived. In that event, the rectangle 490 represents a suitable intermediate frequency amplifier followed by a second detector which would supply with succeeding audio frequency amplifiers, suitable operating or audio currents for the translating device 492. Also, the rectangle 490 may have the several stages of heterodyning if found desirable.

Reception is not limited to only the magnetic frequency multiplier stage but any other later stage of my system as described in Figures 1a and 1b may be used for reception. Thus, in Figure 14 I have shown modified and very diagrammatically, circuits somewhat similar to my high frequency amplifier #1. The grids of these amplifiers as described in connection with Figure 1b are grounded by means of condensers 272, grid bias being fed to conductor 274. Heating current for the filaments passes through choke coil 494 from battery or potential source 496 and returned to ground through choke 498. A circuit 500 having uniformly distributed inductance and capacity is connected through blocking condensers 502, 504 to the cathodes or filaments, and this circuit 500 is suitably tuned by means of slider 506 which may be grounded as shown. The short wave antenna may be connected in any suitable fashion to the transmission line 508 and inductively associated with circuit 500. Any suitable high frequency source such as the system referred to and including high frequency amplifier #1 of Figure 1b may also be used to feed into circuit 500 through transmission 510 high frequency beating energy. The beat may be resonated in circuit 512 and the beat energy fed across resistor 514 into a suitable detector and audio frequency amplifier 516 in order to produce the transmitted signal for actuating ear phones 518. It goes without saying of course, that the apparatus 516 may include further local oscillators and further intermediate frequency amplifiers as well as detectors for reproducing the transmitted signal. Also transmission line 510 and its associated oscillator system may be dispensed with and in that event, the tubes and circuits should be biased as to have an asymmetric characteristic. In this case an audio frequency voltage will appear across a resistor 514 which may be amplified by audio frequency amplifier 516 in order to actuate the ear phones 518.

Many minor changes may, of course, be made in the arrangements which I have described. Accordingly, my present invention is not to be limited by the exact illustrations or specific descriptions given herewith but is to be given the full scope and breadth indicated in the appended claims.

Having thus described my invention, what I claim is:

1. A frequency multiplier comprising an electron discharge device having within an hermetically sealed container an electron emitting cathode and anode, and a relatively cold electrode, a member at substantially zero alternating current potential, a circuit tuned to a fundamental frequency connected between said cold electrode and said member, and a circuit tuned to a harmonic of said fundamental connected between said cathode and said anode, tuning means between said cathode and member, and a coil surrounding said container for applying a magnetic field in a direction perpendicular to the flow of electrons from said cathode to said anode.

2. A frequency multiplier comprising an electron discharge device having, within an hermetically sealed container, an electron emitting cathode and a relatively cold electrode, a member at substantially zero alternating current potential, a circuit tuned to a predetermined frequency coupled to said cold electrode and member, a circuit from which harmonic frequency energy may be derived connected between said cathode and said member.

3. A frequency multiplier comprising two hermetically sealed envelopes each containing a cathode and a cold electrode, a circuit connecting said cold electrodes in phase opposition, means for supplying fundamental frequency energy to said circuit, a member at substantially zero high frequency energy, means for connecting said cathodes effectively in parallel for high frequency currents, and a high frequency circuit tuned to a harmonic of said fundamental coupled between said cathodes and said member.

4. A frequency multiplier comprising a plurality of electron discharge devices each having an hermetically sealed container in which are contained an electron emitting cathode and at least one cold electrode, a circuit for fundamental frequency energy coupled to said cold electrodes a conductor at substantially zero high frequency potential, and a circuit from which harmonic frequency energy may be derived connected between said cathodes and conductor.

5. A frequency multiplier in accordance with claim 4, wherein a third circuit tuned to the frequency of the harmonic energy is connected to said cold electrodes and to said conductor for preventing the flow of harmonic frequency energy into said first mentioned circuit coupled to said cold electrodes.

6. A frequency multiplier comprising an electron discharge device having within an hermetically sealed container an electron emitting cathode and a relatively cold electrode, an element at substantially zero high frequency potential, a first circuit having substantially uniformly distributed inductance and capacitance connected for supplying energy of a fundamental frequency to said cold electrode, and a second circuit having substantially uniformly distributed inductance and capacitance tuned to a harmonic of said fundamental coupled between said cathode and said element.

7. A frequency multiplier comprising an electron discharge device having within an hermetically sealed container an electron emitting cathode and a relatively cold cathode, an element at substantially zero high frequency potential, a first circuit having substantially uniformly distributed inductance and capacitance connected for supplying energy of a fundamental frequency to said cold electrode, said first circuit having a voltage nodal point, and a second circuit having substantially uniformly distributed inductance and capacitance and tuned to a harmonic of said fundamental coupled between said cathode and said element, and a third circuit coupled between said voltage nodal point on said first circuit and said element for preventing the flow of harmonic frequency energy into said first circuit, said third circuit being tuned to act as a short circuit for the flow of harmonic energy.

8. A frequency multiplier comprising a first pair of tubes and a second pair of tubes, each tube of said pairs having a cathode and a cold electrode, the cathodes of each pair of tubes being coupled in parallel for heating current, and a circuit coupling the cathodes of one pair of tubes in phase opposition to the cathodes of the other pair of tubes with respect to radio frequency energy, an output circuit coupled to said last circuit, an input circuit coupled in phase opposition to the cold electrodes of one of said pair and connections coupling the cold electrodes of said one pair of tubes in parallel relation to the corresponding cold electrodes of the other pair.

9. A frequency multiplier comprising two pairs of electron discharge devices each device having an electron emitting cathode and a relatively cold electrode, a circuit having substantially uniformly distributed inductance and capacity tuned to a fundamental frequency connected in phase opposition to the cold electrodes of each pair of said devices, the cathodes of each pair being connected in parallel, and a circuit having substantially uniformly distributed inductance and capacity tuned to a harmonic frequency connected in phase opposition between the cathodes of one pair of devices and the cathodes of the other pair of devices.

10. Apparatus in accordance with claim 9, including means comprising conductors having uniformly distributed inductance and capacity connected between points on said first mentioned circuits which serve to connect the cold electrodes in phase opposition for preventing undesired reaction.

11. A frequency multiplier comprising a plurality of pairs of electron discharge devices each device having an electron emitting cathode and a cold electrode, a circuit consisting of conductors having substantially uniformly distributed inductance and capacity connecting the cold electrodes of two of said devices in phase opposition, a similar circuit similarly connecting cold electrodes of another pair of said devices, a short transmission line connecting said circuits in parallel, said transmission line being so tapped on to said circuits that energy is fed from one of said circuits to the other through said transmission line without reflection, each of said circuits being adjusted to a fundamental frequency, means for supplying fundamental frequency energy to one of said circuits, a third circuit having substantially uniformly distributed inductance and capacity and tuned to a harmonic frequency connected between said circuits tuned to the fundamental frequency, means for connecting the cathodes of the tubes whose cold electrodes are connected in phase opposition, in parallel, a circuit having substantially uniformly distributed inductance and capacity and tuned to said harmonic frequency connecting in phase opposition said parallelly connected cathodes, and an output circuit coupled to said last mentioned harmonically tuned cathode circuit.

12. A frequency multiplier in accordance with claim 11, wherein means are provided for subjecting electrons flowing from said cathodes to said cold electrodes to a magnetic field, said means being arranged so that said magnetic field is applied in a direction normal to the direction of travel of the electrons.

13. A frequency multiplier comprising an hermetically sealed container wherein are contained an electron emitting electrode, and a relatively cold electrode spaced away from said electron emitting electrode, a conductor of constant direct current potential, a circuit for applying fundamental frequency energy between said cold electrode and said conductor, and a circuit connected between said electron emitting cathode and said conductor from which harmonic frequency energy may be derived.

14. A frequency multiplier comprising a pair of electron discharge devices each having an electron emitting cathode, and a relatively cold electrode, a fundamental frequency input circuit connected in phase opposition to said cold electrodes, and a harmonic frequency output circuit connected in phase opposition to said cathodes.

15. A frequency multiplier comprising an electron discharge device having within an hermetically sealed container an electron emitting cathode and a relatively cold electrode, input and output circuits each devoid of concentrated reactance connected to the electrodes of said device, said input circuit being supplied with energy of fundamental frequency and said output circuit obtaining energy of harmonic frequency, and a third circuit tuned to the frequency of the harmonic energy and capacitively coupled to the cold electrode and to the cathode of said electron discharge device preventing the flow of harmonic frequency energy into said circuit of fundamental frequency.

16. A frequency multiplier comprising a pair of electron discharge devices each having an electron emitting cathode and a relatively cold electrode, a tuned circuit for supplying fundamental frequency energy connected in phase opposition to said cold electrodes, and a high frequency circuit devoid of concentrated reactance and tuned to a harmonic of the fundamental from which harmonic frequency energy may be derived connected between said cathodes.

17. Apparatus as claimed in the preceding claim wherein a third circuit tuned to the harmonic frequency is coupled to the cold electrodes for preventing the feed back of harmonic frequency energy into said fundamental frequency energy input circuit.

18. A frequency multiplier comprising a plurality of electron discharge devices each having an electron emitting cathode and a cold electrode, a circuit tuned to a fundamental frequency connected in phase opposition to said cold electrodes a single phase source of energy feeding energy into said circuit tuned to a fundamental frequency, and a circuit tuned to a harmonic frequency connected, for harmonic frequency energy, between said cathodes.

19. A frequency multiplier comprising an electron discharge device having, within an hermetically sealed container, an electron emitting cathode and a relatively cold electrode, a member at substantially zero alternating current potential, a circuit tuned to a predetermined frequency coupled to said cold electrode and said member, a circuit from which harmonic frequency energy may be derived connected between said cathode and said member, and another circuit tuned to the frequency of said harmonic energy coupled between said cold electrode and said member for preventing the flow of harmonic energy into said circuit of predetermined frequency.

20. A frequency multiplier comprising an electron discharge device having within a hermetically sealed container an electron emitting cathode, an anode, and a relatively cold electrode, a member at substantially zero alternating current potential, a circuit having substantially uniformly distributed inductance and capacitance tuned to a fundamental frequency connected between said cold electrode and member, and another circuit having substantially uniformly distributed inductance and capacitance tuned to a harmonic of said fundamental connected between said cathode and said anode.

21. A frequency multiplier comprising two hermetically sealed envelopes each containing a cathode and a cold electrode, a circuit connecting said cold electrodes in phase opposition, there being a voltage nodal point on said circuit, means for supplying fundamental frequency energy to said circuit, a member at substantially zero high frequency energy, means for connecting said cathodes effectively in parallel for high frequency currents, a high frequency circuit tuned to a harmonic of said fundamental coupled between said cathodes and said member, and an additional circuit tuned to a harmonic energy coupled between said voltage nodal point on said first circuit and to said member for preventing the flow of said harmonic energy into said first circuit.

NILS E. LINDENBLAD.